June 9, 1959  S. A. TURK  2,890,444
MULTI-PURPOSE WARNING BLINKER
Filed April 17, 1956
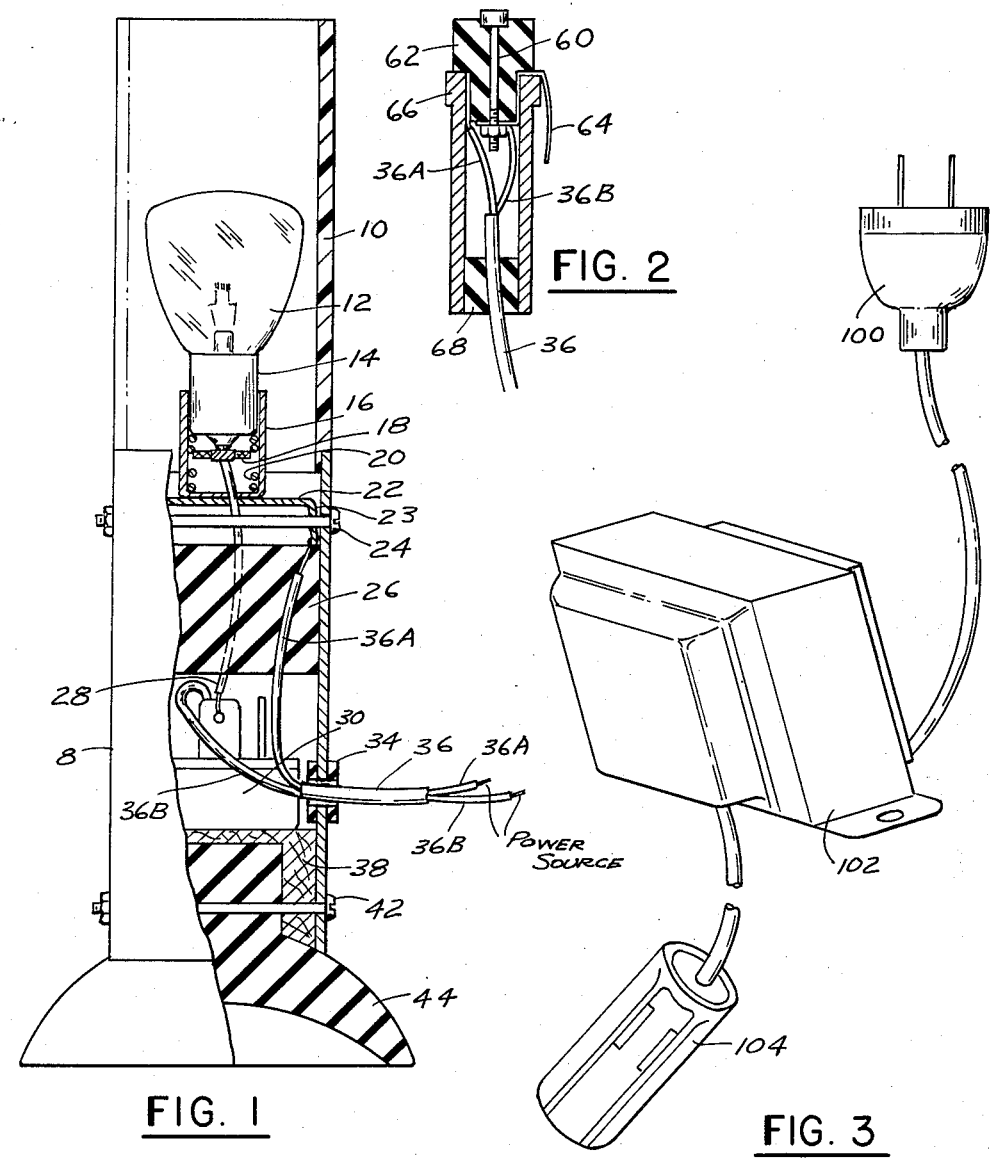
FIG. 1  FIG. 2  FIG. 3
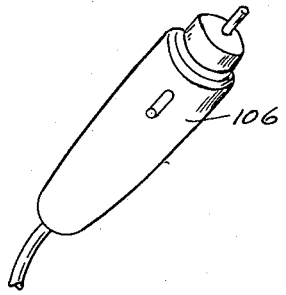
INVENTOR.
SOLOMON A. TURK
BY
ATTORNEYS.

United States Patent Office 2,890,444
Patented June 9, 1959

2,890,444

MULTI-PURPOSE WARNING BLINKER

Solomon A. Turk, Brooklyn, N.Y.

Application April 17, 1956, Serial No. 578,789

2 Claims. (Cl. 340—366)

This invention relates to electric beacons; and more particularly is to portable warning beacons and electric connection means therefor which function as roadmarkers to provide danger signals on highways and featured especially by the inclusion of means for absorption of moisture to prevent corrosion of the inner wall and the components of the beacon.

The various warning beacon devices heretofore known have suffered substantial corrosion when they have been operated under rainy conditions. The rain falling thereon tends to accumulate and penetrates particularly to the interior thereof so that the moisture, because of its inability readily to escape, causes corrosion. I have found that it is now possible to provide a warning beacon with means for absorbing moisture, when operated under the conditions aforesaid so that water which accumulates is prevented from penetrating into the interior of the device and thereby keeps the internal components dry. The provision of a moisture absorbing material, as for example of spongelike characteristics having great water absorptive capacity, makes it possible to operate the device under rainy conditions. When the beacon with the water thus absorbed is set aside, the water evaporates especially when the device is provided with a means of allowing for ventilation.

Among the principal objects of this invention is the provision of a highly dependable and rugged electric warning beacon, especially adapted for use as a danger signal on highways; and also adapted for utilization in connection with alternating currents of higher voltages than are provided by the electrical system of automobiles.

Another principal object is the provision of such a warning beacon with means for absorption of moisture when exposed under rainy conditions so as to prevent corrosion of the components of the beacons.

A still further object of this invention is to provide, in a warning beacon having a moisture absorbing element or component therein, means that allow for ventilation, as by passage of an air current therethrough, to accelerate the drying of the said component after it has absorbed moisture.

A still further object of the invention is to provide a highly portable and efficient warning beacon, having the features above described that can be fabricated at relatively low cost without sacrificing dependability and efficiency.

The above objects as well as further objects and advantages will become more apparent from the following detailed description of the invention and the accompanying drawings, wherein:

Fig. 1 is a side elevation, in partial section, of one embodiment of this invention.

Fig. 2 illustrates a cross-sectional view of an electric connector adapted for plugging the cable of the warning beacon into a cigarette lighter receptacle of an automobile.

Fig. 3 is a view illustrating, in perspective, means for connecting the warning beacon to a source of A.C. current.

Referring now to Fig. 1, the numeral 8 designates a shell of tubular stock, as for example metal or other suitable material. Mounted on the upper end of said shell is a removable, preferably red colored, transparent or translucent tube 10. Mounted within shell 8 is a platform 22, as of metal or other suitable material, provided with a depending peripheral lip 23, the external diameter of which is suitably or slightly less than the internal diameter of the shell 8. The spacing between 23 and the shell 8 provides a gap, the function of which will be hereinafter explained. Platform 22 is secured at the desired position within shell 8 by means of a screw or bolt 24, or other suitable means.

Mounted on the upper side of platform 22 is an electric light assemblage comprising an electric light bulb, of suitable candle power consisting of the envelope 12 and the base 14. The base 14 is fitted into socket 16 secured to 22. The contact point at the center of the bottom of the base 18 makes electrical contact with contactor 18 within the socket, which is yieldably secured by means of the spring 20.

The shell 8 is mounted on a base 44, preferably fabricated of insulating material posesssing a degree of elasticity although it is apparent that it may be made of any appropriate or suitable stock. The lower portion of the base 44 is generally hemispheric in shape with the underside thereof hollowed out thereby to provide a vacuum cup effect if desired, the upper side of the base terminating in a necklike position. Said necklike portion fits into an axially disposed cavity in a block 38 which is positioned within the bottom end of shell 8. The assemblage of block 38 and the base 44 may be secured as by means of the screw or bolt 42.

Positioned beneath the platform 22, there is a water or moisture absorbent component 26, as of spongelike material (synthetic or natural) which is disposed in a snug-fitting relationship with inner wall of shell 8. Positioned between the top of block 38 and the moisture absorbing element 26 is an electric flasher unit 30. A cable 36 provided with wires 36A and 36B, for connection to the power source enters the shell 8 through a grommet 34, the orifice of which is of diameter to provide an air gap so that air may enter the inside of shell 8. The wire 36A, within the shell, is suitably connected to the platform 22, while wire 36B is connected to a terminal of the flasher, 30. A wire 28 connects 18 with a terminal of the flasher.

In Fig. 2 there is shown a plug or connector comprising a tubular body 66, of metal or other suitable material, having an insulating bushing 68 in one end thereof, through which the cable 36 passes. The other end of the body 90 is adapted to receive a cylinder of insulating material 62. Cylinder 62 may be secured to 66 by frictional engagement or threadedly or by any other suitable means. A conductive springlike element 64 provides one of the electric contact points of the plug, said spring being electrically connected inwardly of the plug with wire 36A. A metal rod 60, extending axially of 62, is connected at its lower end with wire 36B.

As seen in Fig. 3, the beacon may be operated from a source of current of higher voltage and of alternating character, by the intermediacy of a transformer 102, the primary of which is supplied by a source of alternating current brought thereto by means of a cable having a plug 100 at the free end thereof.

Leading from the secondary of the transformer 102 is a cable which terminates in a suitable receptacle, 104 that is adapted to receive a plug, as for example 106 connected to the free end of the cable 36. It will be understood that plug 106 is akin in electrical operation to the plug illustrated in Fig. 2.

An especial feature of this beacon resides in the fact that when it is operating in the rain, the water falling into the light transmitting tube 10, does not collect around the base of the socket 16 but gravitationally, or by capillary attraction, or by a combination of both gravity and capillarity, is absorbed by the moisture absorbent component 26. The moisture thus absorbed is prevented from falling to the lower part of the shell 8 and thus the flasher and its terminals and the interior of the shell wall are protected against corrosion. After the beacon has served as a warning device, the moisture absorbed during the warning period is yielded up by 26. The gap between 23 and the inner wall of the shell and the gap in the grommet 34 allows for movement of an air stream containing water in vapor form that is yielded up by 26 during the drawing out operation.

It will be apparent from the foregoing description of the invention that the provision of the moisture absorbing element 26 makes it possible to operate the warning beacon while it is raining; and that there is obviated the deterioration of the device which would otherwise follow in a sequence of accumulation of water, especially the parts and components of the device in the space between the support for the socket and the base within which the flashing element is located. The structure thus provides protection for the interior against moisture which may be likened to that of sealing the interior.

It will be understood that the foregoing description of the invention and the embodiment set forth are merely illustrative of the principles thereof. Accordingly, the appended claims are to be construed as defining the invention within the full spirit and scope thereof.

I claim:

1. A warning beacon comprising a base, a tubular shell secured to said base, a light transmitting tube disposed axially of said shell, a platform within said shell positioned near the end thereof opposite the base, said platform having a lip, said lip being spaced from the internal wall of the shell by a gap, socket means on said platform for receiving an incandescent bulb whereby the major portion of the bulb is surrounded by the aforesaid light transmitting tube, a moisture absorbing element disposed intermediately of the said platform and said base, and electrical means for operating said bulb, including a flasher, disposed intermediately of said moisture absorbing element and the base.

2. A structure in accordance with claim 1 wherein the moisture absorbing element is a sponge-like material.

References Cited in the file of this patent
UNITED STATES PATENTS

| | | |
|---|---|---|
| 1,148,662 | Dennis | Aug. 3, 1915 |
| 1,473,400 | Dunn | Nov. 6, 1923 |
| 1,584,369 | Graham | May 11, 1926 |
| 1,866,750 | Brownell | July 12, 1932 |
| 2,532,800 | Adinamis et al. | Dec. 5, 1950 |
| 2,675,545 | Wolper | Apr. 13, 1954 |
| 2,704,322 | Strayline | Mar. 15, 1955 |